Aug. 22, 1933.   L. C. HUCK   1,924,060
METHOD OF AND MEANS FOR COOLING BRAKES
Original Filed Dec. 26, 1925   5 Sheets-Sheet 1

Inventor:
Louis C. Huck,
by Wallace R. Lane
Atty

Aug. 22, 1933. L. C. HUCK 1,924,060
METHOD OF AND MEANS FOR COOLING BRAKES
Original Filed Dec. 26, 1925 5 Sheets-Sheet 2
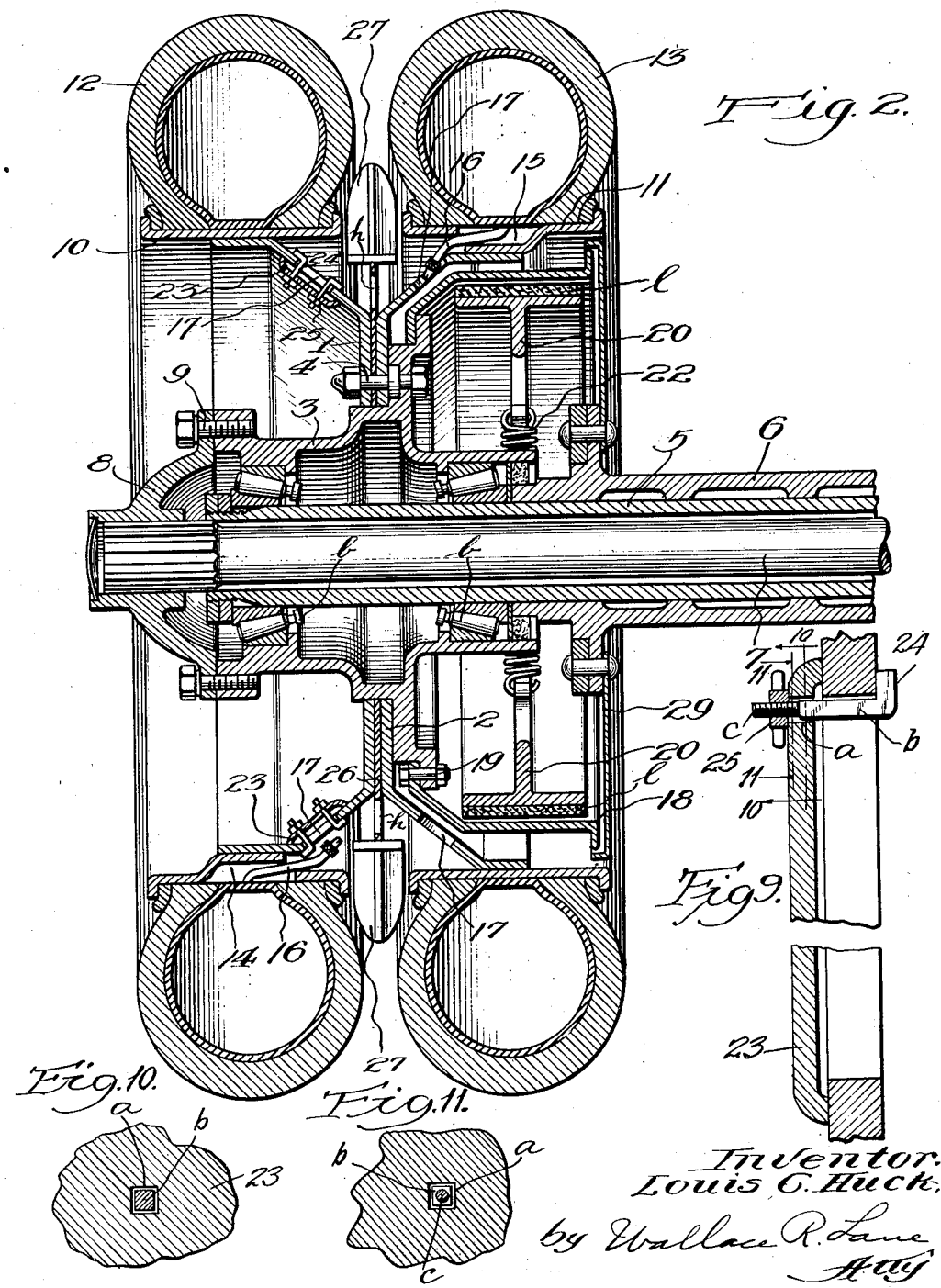

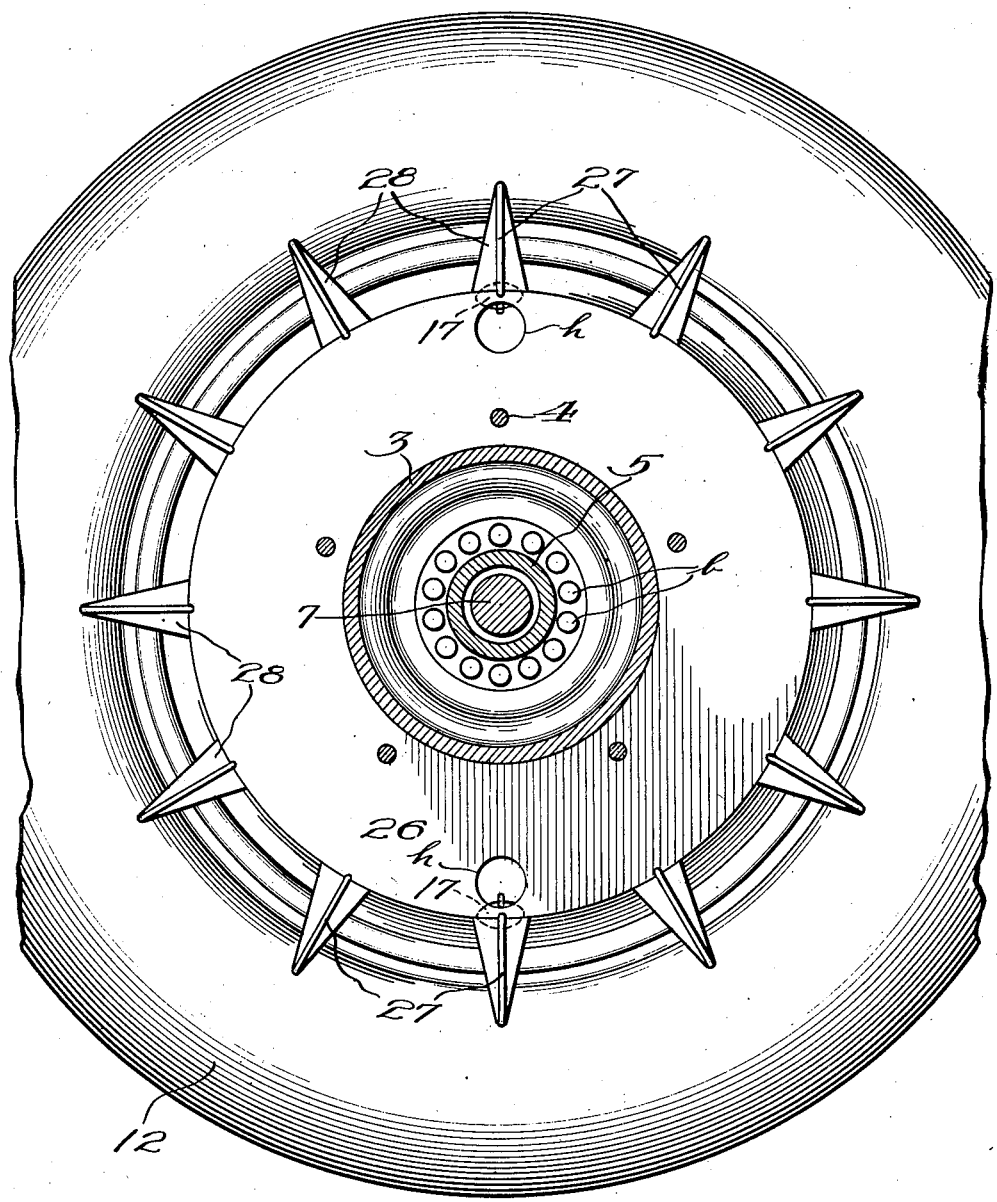

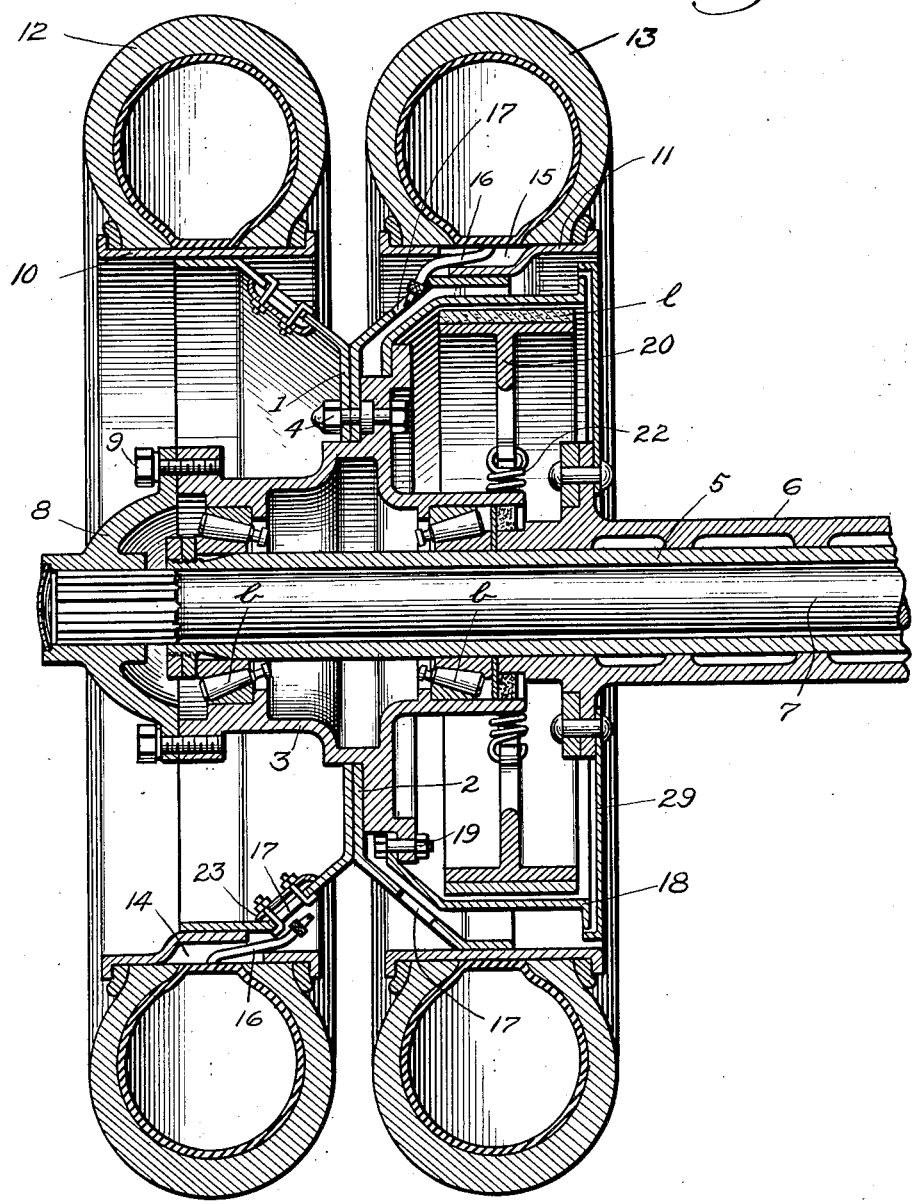

Aug. 22, 1933.    L. C. HUCK    1,924,060
METHOD OF AND MEANS FOR COOLING BRAKES
Original Filed Dec. 26, 1925    5 Sheets-Sheet 5
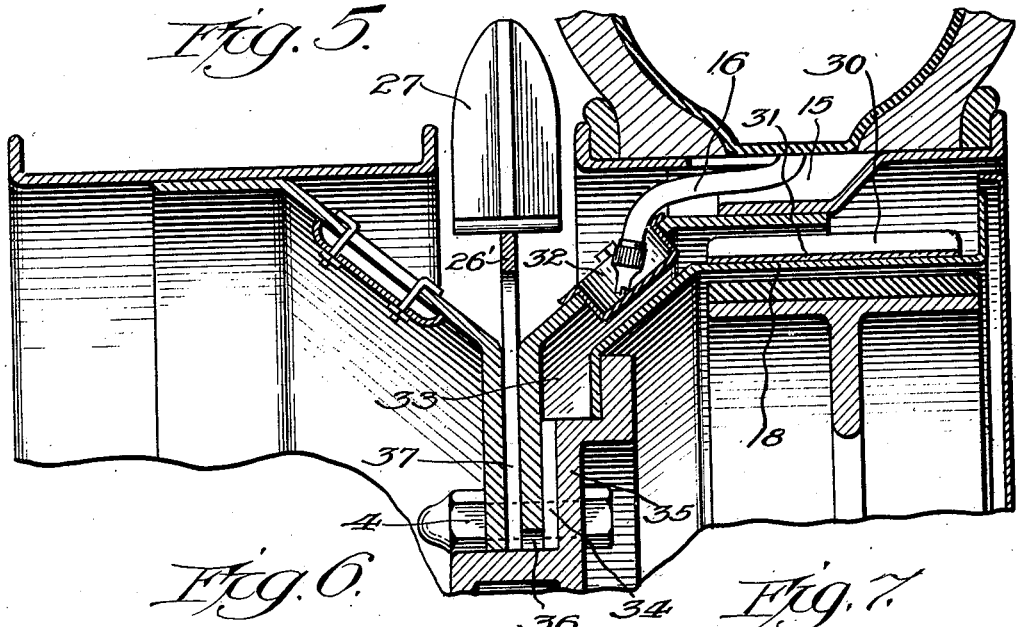
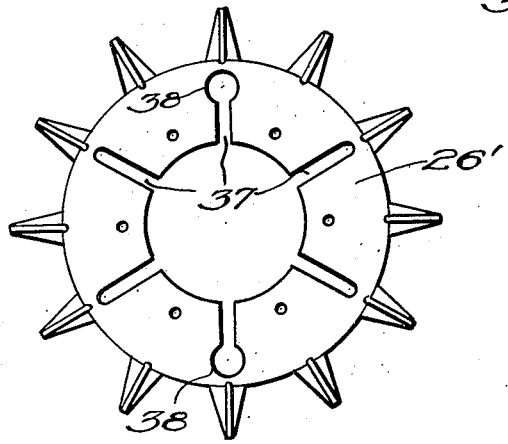
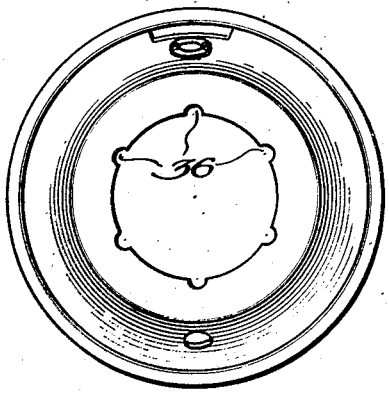
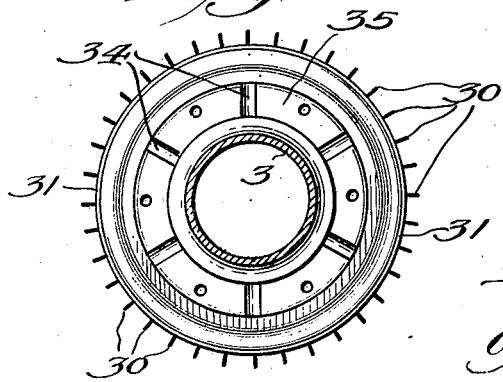
Inventor:
Louis C. Huck
by Wallace R. Lane
Atty.

Patented Aug. 22, 1933

1,924,060

UNITED STATES PATENT OFFICE 1,924,060

METHOD OF AND MEANS FOR COOLING BRAKES

Louis C. Huck, New York, N. Y.

Refile for abandoned application Serial No. 77,733, December 26, 1925. This application March 31, 1930. Serial No. 440,524

6 Claims. (Cl. 188—264)

This invention relates to method of and means for cooling brakes and adjacent parts, and more particularly to such method and means when the brakes are housed within one of the dual disc wheels very frequently used on heavy motor vehicles.

As is well known in the automotive industry brakes have heretofore been a source of trouble when required to absorb large amounts of energy in a comparatively short interval of time, due to the results of the high temperatures of the braking mechanism resulting under such conditions. One of the results referred to above is the lowering of the coefficient of friction of the average present day fabric brake liners with the attendant reduction of the braking action resulting from a given force or effort applied to the brake actuating means. Another result is the more rapid wear and shorter useful life of such fabric brake liners. Another such result is the shorter life of the tires when the brake mechanism is housed in the concave side of a disc wheel.

In most states legislation limits over all width of vehicles. For stability, riding qualities and efficiency it is desirable to mount road springs on the axle as far apart as possible. The spacing of road springs is limited by interference of road springs or spring clips with brake mechanism, or with wheels or tires if the brake mechanism is housed inside of a wheel. Heavy vehicles mounted on pneumatic tires frequently use dual rear tires mounted on disc wheels.

In order to allow wide spring spacing, the brake drums of such vehicles are usually mounted inside of the inner disc wheel. It is desirable to use as large diameter of brake drum as possible in order to get greater braking action and longer life. The disadvantage, however, of so doing is that the air space between the brake drum and the rim of the inner wheel becomes too small to allow much circulation of air. The air in this air space becomes heated and the heat transfer from the brake drum to the air surrounding it decreases, resulting in increased temperature of brake drums for a given amount of heat generated by friction. The heat thus generated is transferred to the wheel rim by conduction through disc of wheel and by radiation and also by convection by and conduction through the heated air in the space between the brake drum and the rim, and thence to the tire.

This heating of the tires is extremely undesirable as it shortens the life of the tires and in extreme cases causes devulcanizing or softening of the rubber with attendant blowouts.

Among the objects of my invention is to provide a method of and means for causing a forced circulation of cool air through the air space between the brake drum and the rim, thus increasing the escape of heated air from around the brake drum to the outside air, and consequently reducing the temperature of the drum, since by the constant supply of cool air to the air space between the drum and rim the air therein is kept comparatively cool, and avoids that part of the transfer of heat to the rim (and thence to the tire) brought about by convection by and conduction through the air in the space between drum and rim.

The introduction of such a current of cool air through the space between the brake drum and rim will cool the rim by carrying away some of the heat transferred to the rim from the drum by radiation. Such a transfer of heat (i. e. transfer by radiation) from drum to rim can also be reduced by polishing these parts or by other means reducing the coefficients of absorption and emission.

A further object is to circulate a current of air around the brake mechanism for carrying away the heat generated by the brake drum to increase the life of the brake linings and tires, and to avoid a decrease in the coefficient of friction of the brake liner due to high temperatures, thereby avoiding a decrease in sensitiveness of the brakes by reason of their absorbing a large amount of energy in a comparatively short interval of time.

A further object is to prevent undue scoring of the brake drums.

Other objects, advantages and capabilities will more readily become apparent as the following description proceeds.

My invention further resides in the combination, construction and arrangement of parts illustrated in the accompanying drawings, and while I have shown therein a preferred embodiment I wish it to be understood that the same is susceptible of modification and change without departing from the spirit of my invention.

In the drawings:

Fig. 2 is a vertical sectional view taken on the line 2—2 of Fig. 1.

Fig. 3 is a vertical section on a plane between the two disc wheels and showing in side elevation the impeller or rotor.

Fig. 4 is a view similar to Fig. 2 but showing a modification in which the impeller or rotor is omitted.

Fig. 5 is a fragmentary section through a portion of the wheel showing a modification.

Fig. 6 is an elevation of the impeller disc plate used in this modified form.

Fig. 7 is an elevation of the wheel disc of this modification.

Fig. 8 is a section through the hub of this modified form and showing in elevation the hub flange and the attached brake drum.

Figure 1:
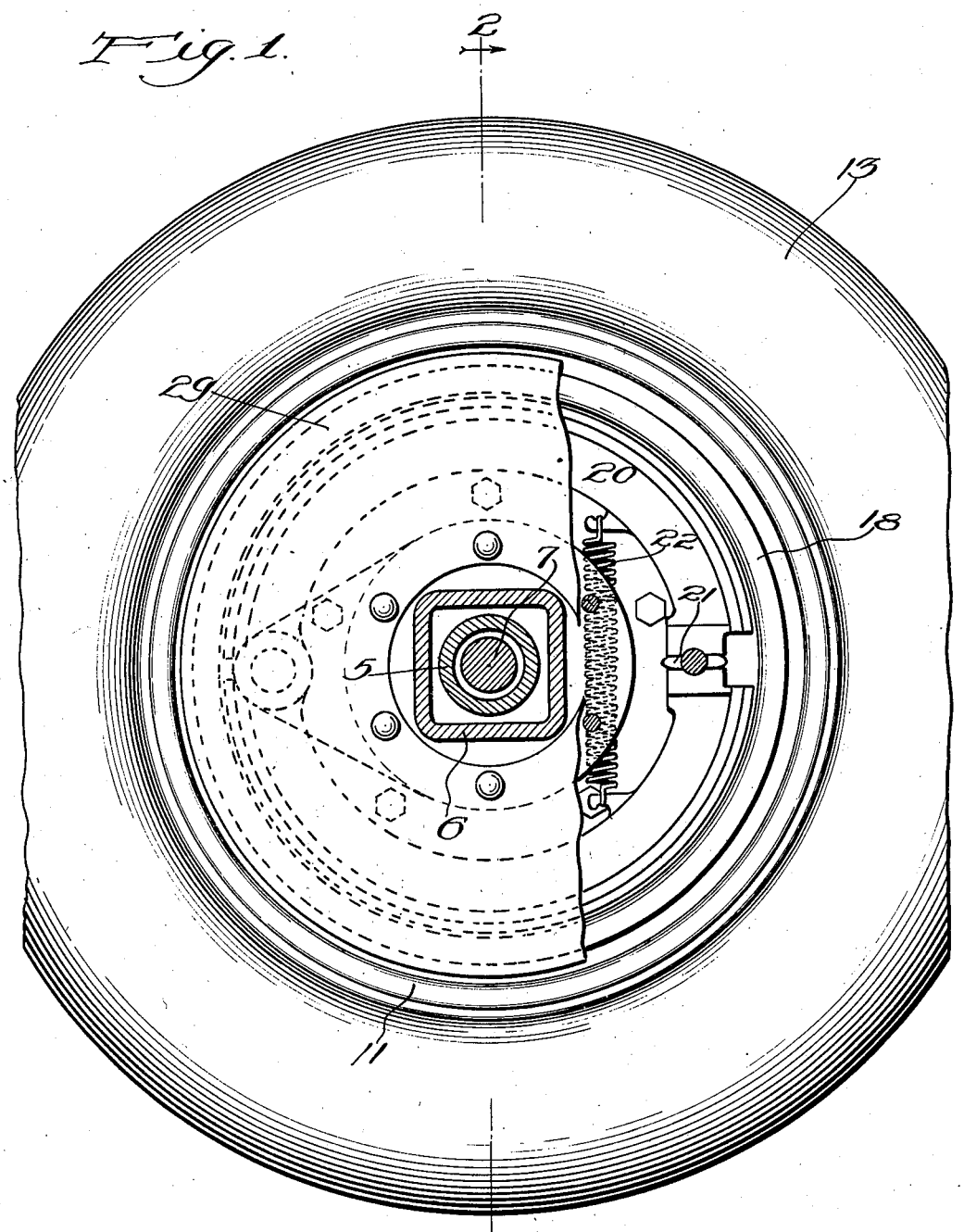
Fig. 1 is a side elevation partly broken away showing wheels and brake mechanism looking outwardly from the center of a vehicle chassis.

Fig. 9 is a sectional view partly broken away through the cover plate 23, taken on a plane passing through one of the hooked bolts 24 and wing nut 25.

Fig. 10 is a fragmentary sectional view taken on the line 10—10 of Fig. 9.

Fig. 11 is a section taken on the line 11—11 of Fig. 9.

For the purpose of illustration the mechanism embodying my invention is shown in the drawings in connection with dual disc wheels equipped with pneumatic tires, and the brakes shown are of the internal expanding type. It is obvious, however, that my invention is not restricted in its use to this particular construction of either brake or brake drum housing, but may be utilized in other embodiments involving the problems solved herein.

Referring to the drawings, the outer disc wheel 1 and the inner disc wheel 2 are mounted on hub 3 and rotated therewith through the medium of studs or bolts 4. Hub 3 rotates on bearings $b$ mounted on tube 5, which is pressed into and supported by housing 6. Axle shaft 7 serves to rotate the hub 3 through the medium of drive plate 8 and bolts 9, respectively. The axle shaft is rotated by a source of power through suitable power transmission mechanism not shown. Rims 10 and 11 are mounted on and in this illustration form an integral part of disc wheels 1 and 2, respectively. Outer and inner tires 12 and 13 are mounted on rims 10 and 11, respectively, rim 10 being provided with depression 14, and rim 11 with depression 15, through which depressions the inner tube valves 16 extend. Access to valve 16 is had through ports 17 provided in disc wheels 1 and 2. Each wheel has two such ports so located with reference to the holes for driving studs 4 that the wheels are interchangeable, thus permitting the outer wheels to be always capable of being so mounted that there is a port opposite the inner wheel valve.

The brake drum 18 is a fastened to hub 3 by bolts 19 passing through a circular flange provided on hub 3, as shown in Fig. 2. Within the brake drum 18 are suitably mounted brake shoes 20, which can be brought into frictional contact with the brake drum 18 by means of cam 21 (see Fig. 1) or other suitable actuating mechanism. Brake shoes 20 are pulled out of engagement with drum 18 through the action of springs 22 upon release of the cam or actuating mechanism 21. Each of the brake shoes is provided on its active face with the usual brake lining 1. In order to keep dust, dirt and other foreign matter out of the brakes the dust shield 29 is provided on the inner face of the brake drum, as shown in Fig. 2.

Ports 17 in the outer wheels are closed substantially air-tight by cover plates 23, suitable means being provided for holding these cover plates against the disc wheel. In the particular embodiment shown in the drawings these cover plate holding means are in the form of hook bolts 24 and wing nuts 25. These hook bolts 24 pass through squared holes $a$ provided in covers 23, and are made of square stock $b$ with threaded ends $c$ circular in cross-section for a sufficient length to permit the square part to be moved longitudinally out of the square hole in the cover, while the wing nuts are still in engagement with the threads. By this construction it is possible for hooks to be inserted when turned inwardly and upon seating of the cover plate against the disc wheel the hook bolts can then be rotated through a sufficient angle to move their angular ends into engagement with the inner face of the disc wheel, after which the nuts 25 may be suitably tightened, which tightening operation will draw that portion of the bolt which is squared in cross-section into engagement with the square holes, to thereafter prevent any accidental turning of the hook bolts to permit the cover plate to become loosened. To remove these cover plates it is only necessary to loosen nuts 26 until the hook bolts can be moved inwardly sufficiently to carry the square section out of the square holes, after which the hook bolts can be rotated inwardly to clear the disc wheel and permit removal of the cover plate.

Secured between disc wheels 1 and 2, and also securely held therebetween by studs 4, is the disc plate 26, which, as seen in Figs. 2 and 3, is provided at suitably spaced intervals around its perimeter with impeller blades 27, for the purpose of causing a more positive movement of the air in the space between the disc wheels and tires. These impeller blades 27 are preferably made of rubber, leather, or other suitable soft material to avoid injury to the blades or tires in case one or both of the tires become flat. These impeller blades are also preferably provided with stiffening ribs 28. The disc plate 26 is also provided with suitable openings $h$ to allow access to valves of the inner tire.

In the operation of the device the impeller blades 27 impart a rotary motion to the air in the marginal space between the disc wheels and between the tires as the wheels revolve. The centrifugal force set up by the rotation of this body of air throws the air out between the tires as in any centrifugal air blower, thus lowering the air pressure within the space. As there are no openings for the air to get into this space through the outer wheels all of the air displaced by this centrifugal force must enter this space through the port holes 17 in the inner disc wheel, and in order to reach these ports it must enter between the inner wheel rim and brake dust shield 29, and pass over the brake drums, absorbing during its passage heat from the brake drums, which heat is carried away by this current of air, resulting in a cooling of the brake drum. This current of air also serves to cool the rim in several ways, first, by directly carrying the heat away therefrom, and second, by reducing the amount of heat radiated from the drum to the rim by reason of the lower drum temperature brought about by this circulation of air, and third, by decreasing the conduction and convection of heat by the air in the space between the drum and rim.

In the modification shown in Fig. 4 I have omitted the impeller or rotor 26 and depend upon the surface friction to carry the air around with the wheel which air, when the wheel has gotten well in motion, will acquire sufficient velocity to cause it to be thrown out from between the two disc wheels and tires by centrifugal force, resulting in the drawing of air inwardly over the brake drum with the cooling effect described above.

It is obvious that the amount the mechanism is cooled depends on the temperature and volume of air passing through the space between the drum and the rim, and also on the amount of surface exposed to this current of air. The surface to be cooled can be increased by adding ribs or fins 30 as shown in Figs. 5 and 8, to the outer circumferential face of the brake drum 18. These ribs can be made integral with the brake drum or attached thereto by means of a band 31, as desired.

To increase the surface available the construction shown in Figs. 5—8 may also be used, wherein the ports 17 of the inner wheel are also closed off by any suitable means such as a depressed cap 32 to accommodate the valve stem, and the air after entering the space between the drum and rim is drawn downwardly through the space 33, the passageways 34 (formed on the outer face of the flange 35 of hub 3), from thence through holes 36, and then upwardly through slots 37 (formed in impeller disc plate 26') and into the space between the tires, from which space the air will be thrown by centrifugal force as explained above. The passageways 34, the holes 36, and the slots 37 will be so positioned with relation to the holes for the bolts 4 that they will be in registry to form a continuous passageway when the parts are assembled. In this form of construction it will be noted that the air before reaching the holes 36 and slots 37 must pass not only over the brake drum perimeter, but also between the back face of the brake drum and the inside face of the disc of the inner wheel, thus further increasing the surface exposed to the cooling action of the air current. Openings 38 are also provided in disc plate 26' to permit access to the valve stem of the tire.

This application is a refiling of abandoned application Serial Number 77,733, filed December 26, 1925.

I claim:

1. In apparatus of the class described a brake mechanism, rotating parts to act as a centrifugal pump, and means having openings connecting the space around said brake mechanism with the outside air on one side and the centrifugal pump on the other to cause a positive circulation of outside air across the braking portion of said brake mechanism, through the pump and back to the outside air.

2. In apparatus of the class described a pair of wheels secured together and having an annular space around their outer portion, a brake drum in one of said wheels, a rim spaced from said drum, the space between the drum and rim having connection on one side with the outside air and connection on the other side with the annular space, and means in the annular space to cause the air therein to rotate therewith so that said last mentioned air will be thrown out from the annular space by centrifugal force and cause a positive circulation of air across the brake drum for cooling purposes.

3. In apparatus of the class described, brake mechanism, associated parts forming a substantially circular air enclosure arranged to rotate with the rotating part of the brake mechanism, said parts having an opening at the outer periphery of said air enclosure, and an air passage connecting the air enclosure with the air space surrounding the peripheral exterior of the brake mechanism to permit the flow of air over the brake mechanism and out through the air enclosure for cooling the brake, and means to cause the air to rotate with the air enclosure until thrown therefrom by centrifugal force.

4. A dual disc wheel comprising inner and outer wheels secured together, a rim and tire on each wheel, brake mechanism housed in one of the wheels, ports in each of said wheels, and means for sealing the ports in one of the wheels to cause the flow of air through the other ports and over the brake mechanism for cooling purposes, and means for creating a suction through said other ports to set up a positive flow of the air.

5. In apparatus of the class described, a pair of disc wheels secured together, a rim and tire on each of said wheels so arranged as to form an annular air space around said wheels, a brake mechanism in one of said wheels, and a series of impellers carried by said wheels to extend into said annular air space to cause the air therein to rotate with the wheels until thrown out from between the tires by centrifugal force to produce a flow of air across the brake mechanism to cool the same.

6. A dual disc wheel comprising inner and outer wheels secured together, a brake mechanism housed in one of said wheels, an impeller disc plate secured between the disc wheels, a supporting member to which the disc wheel and the brake drum are secured, said supporting member having radial grooves each communicating at one end with the space between the brake drum and wheel rim and at the other with a transverse opening through the wheel disc, a plurality of radial slots in said disc plate each registering at one end with one of said transverse openings and extending at its other end into communication with the space between the tires, so that air will be drawn over the brake drum and rim, through said grooves, openings and slots, and discharged from the space between the tires by centrifugal force.

LOUIS C. HUCK.